United States Patent
Kitaguchi et al.

(10) Patent No.: US 7,365,806 B2
(45) Date of Patent: Apr. 29, 2008

(54) PROJECTION DISPLAY APPARATUS INCLUDING A SLIDE MECHANISM TO PREVENT DROPPING OF A SCREEN DURING ATTACHMENT

(75) Inventors: Akihiro Kitaguchi, Tokyo (JP); Toshitaka Tachibana, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 431 days.

(21) Appl. No.: 10/893,337

(22) Filed: Jul. 19, 2004

(65) Prior Publication Data
US 2005/0174497 A1    Aug. 11, 2005

(30) Foreign Application Priority Data
Feb. 6, 2004 (JP) .............................. 2004-030567

(51) Int. Cl.
H04N 5/64 (2006.01)
H04N 5/74 (2006.01)

(52) U.S. Cl. ................... 348/744; 348/787; 348/789

(58) Field of Classification Search ............... 348/744, 348/787, 789, 739; 359/453, 460; 353/79, 353/119
See application file for complete search history.

(56) References Cited

U.S. PATENT DOCUMENTS

| | | | | |
|---|---|---|---|---|
| 3,834,798 A * | 9/1974 | Bundschuh et al. | ........ | 352/104 |
| 5,235,362 A * | 8/1993 | Kronbauer | .................... | 353/71 |
| 6,334,687 B1 * | 1/2002 | Chino et al. | .................. | 353/79 |
| 6,637,896 B2 * | 10/2003 | Li et al. | ...................... | 353/119 |

FOREIGN PATENT DOCUMENTS

| | | |
|---|---|---|
| JP | 8-76256 A | 3/1996 |
| JP | 8-122924 A | 5/1996 |
| JP | 11-311834 A | 11/1999 |

* cited by examiner

Primary Examiner—Victor R. Kostak
(74) Attorney, Agent, or Firm—Birch, Stewart, Kolasch & Birch, LLP

(57) ABSTRACT

A projection display apparatus (1) includes slide bases (106) which are able to protrude from a housing (101). A screen unit (103) is supported by rotation plates (107) rotatably provided on the slide bases (106). The attaching and detaching operations of the screen unit (103) can be performed in a state where the slide bases (106) protrude from the housing (101) and the rotation plates (107) rotate to an operating position. In this operating position, the screen unit (103) is supported by the rotation plates (107) from below, so that the screen unit (103) can be prevented from being dropped on the floor, and therefore the reliability of the operations can be enhanced.

8 Claims, 11 Drawing Sheets

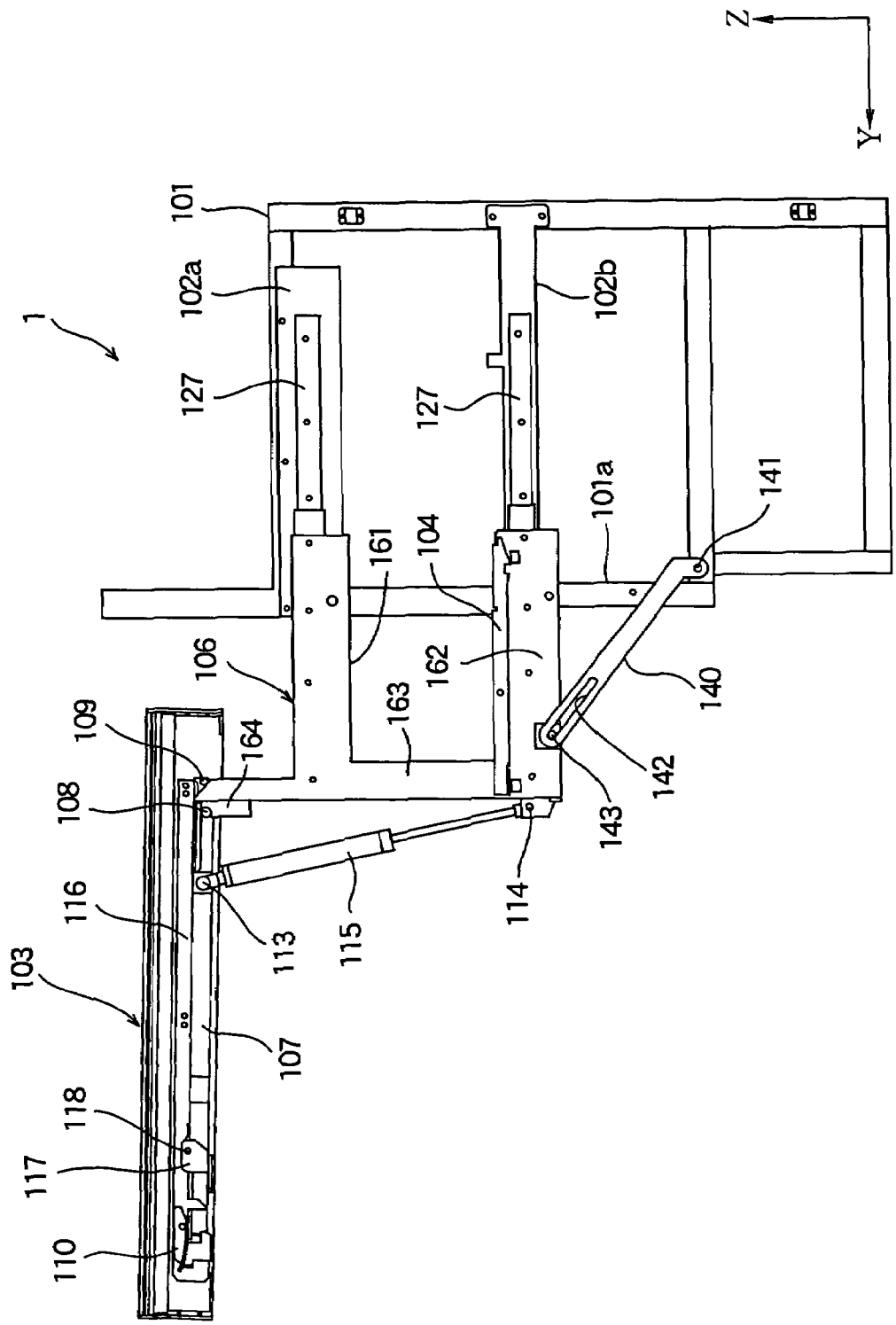

PROJECTION DISPLAY APPARATUS INCLUDING A SLIDE MECHANISM TO PREVENT DROPPING OF A SCREEN DURING ATTACHMENT

BACKGROUND OF THE INVENTION

This invention relates to a projection display apparatus that displays an image by projecting the image on a screen from the rear of the screen.

There is known a projection display apparatus that projects an image on a screen from the rear of the screen, i.e., a rear projection display apparatus. Generally, in the projection display apparatus of this type, a screen unit having a screen is detachably attached to a housing in which a projection unit or the like is accommodated.

In an example of the conventional projection display apparatus shown in FIG. 12, a screen unit 203 is attached to a housing 201 by means of screws 202 extending through the housing 201 in the front-rear direction. Therefore, in order to attach the screen unit 203 to the housing 201, or in order to detach the screen unit 203 from the housing 201, a working space must be provided at the rear of the housing 201. Thus, the attaching and detaching operations are not efficiently performed. Moreover, when the screen unit 203 is attached to or detached from the housing 201, there is a possibility that the screen unit 203 may be mistakenly dropped on the floor and a screen or the like may be damaged. Therefore, it is demanded to enhance the reliability of the attaching and detaching operations of the screen unit.

In another example of the conventional projection display apparatus shown in FIG. 13, the screen unit 203 has lock members 205 that fit in engaging portions 206 formed on the front surface of the housing 201. Such a projection display apparatus is disclosed, for example, in a Japanese Laid-Open Patent Publication No. HEI 11-311834 (particularly, in pages 3 to 4 and FIGS. 1 to 2). With such an arrangement, the attaching and detaching operations of the screen unit 203 become easier. However, there still is a possibility that the screen unit 203 may be mistakenly dropped on the floor and the screen may be damaged.

SUMMARY OF THE INVENTION

An object of the present invention is to prevent a screen unit from being dropped during the attaching and detaching operations of the screen unit, and to enhance the reliability of the operations.

According to the invention, there is provided a projection display apparatus including a screen unit having a screen on which an image can be projected, a projection unit that project the image on the screen from the rear of the screen, and a slide mechanism that supports the screen unit so that the screen unit is movable in a first direction. The first direction is perpendicular to the screen in a state where the image can be projected on the screen. The projection display apparatus further includes a rotation mechanism that supports the screen unit so that the screen unit is rotatable about a rotation axis parallel to a second direction. The second direction is parallel to the screen in a state where the image can be projected on the screen.

With such an arrangement, the attaching and detaching operations of the screen unit can be performed in a state where the screen unit moves and rotates to an operating position in which the screen unit is prevented from being dropped. Therefore, the reliability of the operations can be enhanced. Moreover, in the case where a plurality of projection display apparatuses constitute a multi-projector, the attaching and detaching operations of one screen unit of one projection display apparatus can be performed without interfering with adjacent projection display apparatuses.

Additionally, as the rotation mechanism rotates the screen unit, it becomes possible to perform maintenance on internal components (for example, the projection unit) of the housing from the front of the housing. Therefore, it is possible to perform maintenance without providing a working space at the rear of the housing, with the result that the maintenance can be efficiently performed. Further, since it is not necessary to provide a working space at the rear of the housing, the projection display apparatus can be installed in a relatively narrow space, and therefore the usefulness can be enhanced.

BRIEF DESCRIPTION OF THE DRAWINGS

In the attached drawings:

FIG. 8 is a sectional view of the projection display apparatus according to the embodiment of the present invention in a state where the screen unit rotates to an opening position;

DETAILED DESCRIPTION OF THE PREFERRED EMBODIMENT

An embodiment of the present invention will be described with reference to the attached drawings.

Figure 1:
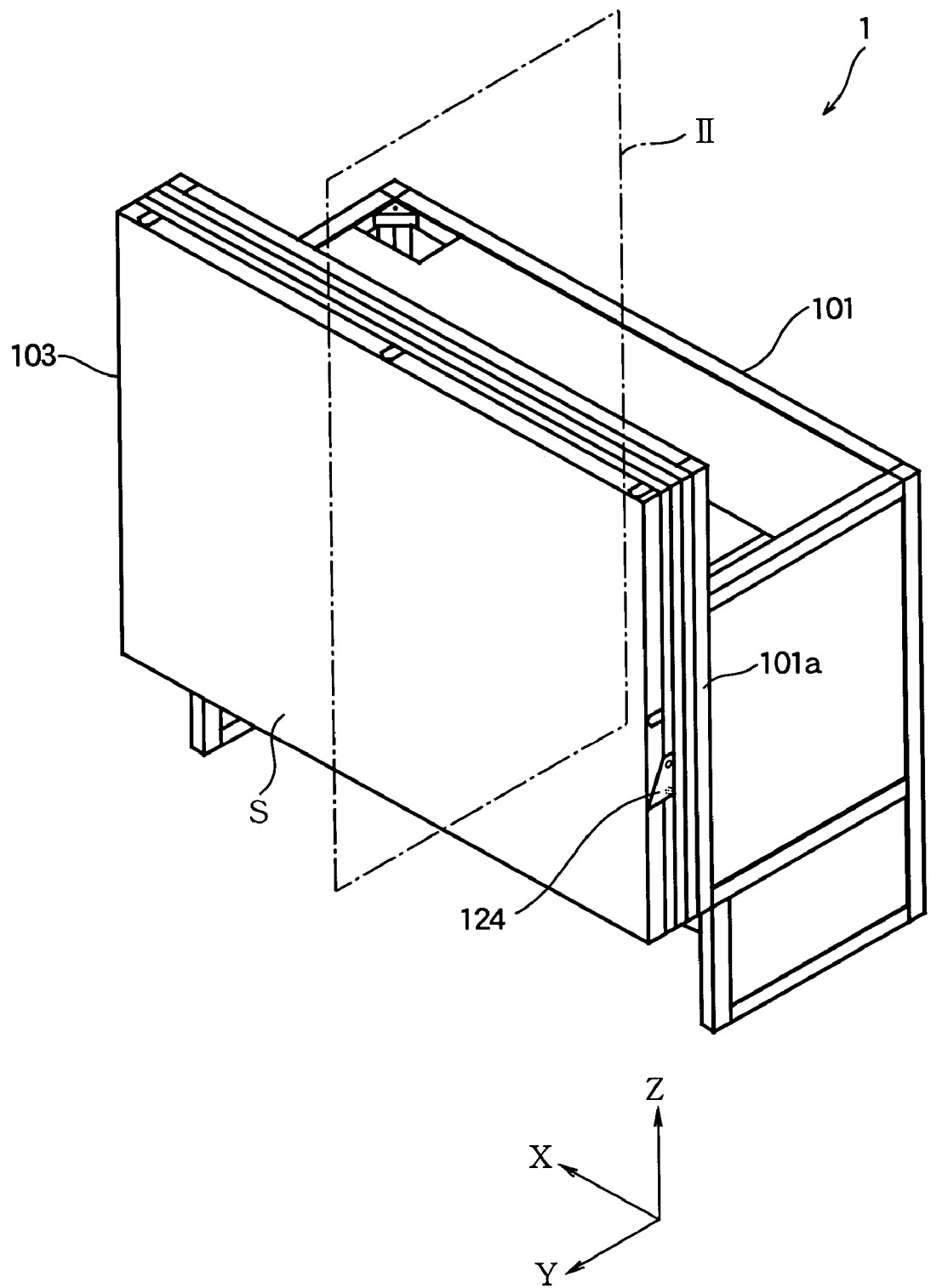
FIG. 1 is a perspective view of a projection display apparatus according to an embodiment of the present invention.
Figure 2:
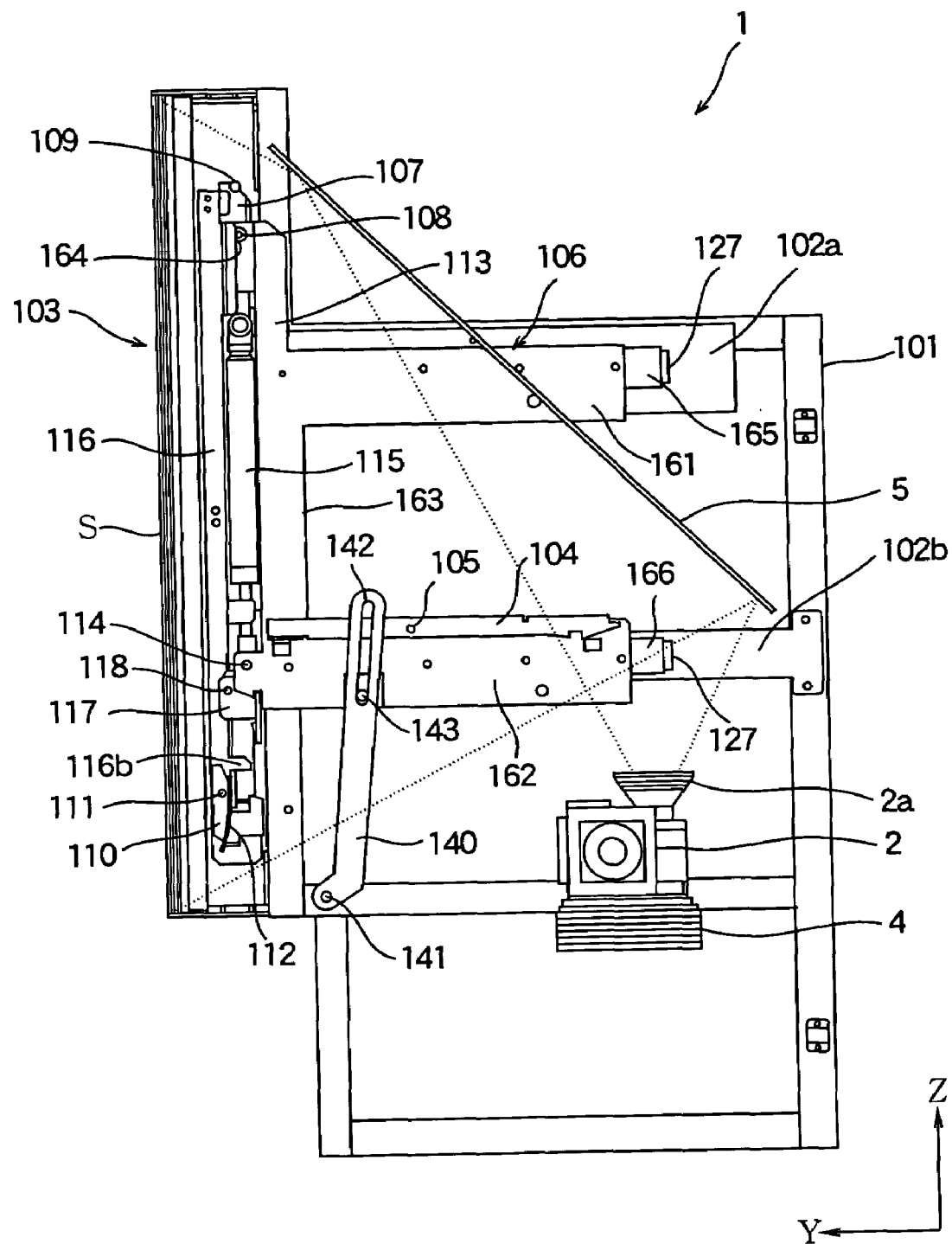
FIG. 2 is a sectional view of the projection display apparatus according to the embodiment of the present invention.

FIG. 1 is a perspective view of a projection display apparatus 1 according to the embodiment of the present invention. FIG. 2 is a sectional view of the projection display apparatus 1 taken along a surface II shown in FIG. 1. The projection display apparatus 1 can be used, for example, in a multi-projector in which a plurality of the projection display apparatuses are arranged. As shown in FIG. 1, the projection display apparatus includes a housing 101 and a screen unit 103 detachably attached to the front of housing 101. The screen unit 103 includes a screen S on which an image can be projected. As shown in FIG. 2, a projection unit 2 is disposed at the lower part of the housing 101. The projection unit 2 projects the image on the screen S of the screen unit 103 via a projection lens 2a. A mirror 5 is disposed on the upper side of the projection unit 2 in the housing 101. The mirror 5 reflects the light emitted from the projection unit 2 toward the screen S. A position adjustment mechanism 4 is provided for adjusting the position of the projection unit 2 relative to the screen S. The projection unit 2, the position adjustment mechanism 4 and the mirror 5 are omitted in FIGS. 3 and 8 described later.

In a state shown in FIG. 1 (i.e., in a state where the image can be projected on the screen S), the direction parallel to the horizontal axis on the screen S is defined as X-direction (i.e., the left-right direction), the direction parallel to the vertical axis on the screen S is defined as Z-direction (i.e., the vertical direction). The direction perpendicular to the screen S is defined as Y-direction (i.e., the front-rear direction). Regarding Y-direction, the direction from the housing 101 toward the screen unit 103 is referred to as positive Y-direction (i.e., frontward), and the opposite direction is referred to as negative Y-direction (i.e., rearward). These directions are defined for the convenience of the description, and are not intended to determine the actual orientation of the projection display apparatus 1.

With respect to the housing 101, the screen unit 103 is movable in the front-rear direction (Y-direction), and rotatable about a rotation axis parallel to the left-right direction (X-direction). Hereinafter, the structure for moving and rotating the screen unit 103 will be described.

First, the structure for moving the screen unit 103 in the front-rear direction with respect to the housing 101 will be described. As shown in FIG. 2, two upper holders 102a and two lower holders 102b are fixed to inner surfaces of both sides of the housing 101 (in FIG. 2, only one upper holder 102a and one lower holder 102b are shown) These two upper holders 102a are laterally symmetrical to each other (i.e., symmetrical about the center of the housing 101 in the left-right direction). Similarly, these two lower holders 102b are laterally symmetrical to each other. The upper holders 102a and the lower holders 102b are elongated in the front-rear direction. Each of the upper holders 102a and the lower holders 102b has a slide rail 127 elongated in the front-rear direction. Two slide bases 106 are slidably supported by the slide rails 127 (in FIG. 2, only one slide base 106 is shown). The two slide bases 106 are laterally symmetrical to each other.

Hereinafter, components expressed in the plural form are disposed on both sides in the projection display apparatus 1 in a laterally symmetrical manner as in the case of the slide bases 106.

Each slide base 106 includes upper and lower horizontal portions 161 and 162 extending in the front-rear direction, and a vertical portion 163 connecting the front ends of the horizontal portions 161 and 162. The horizontal portions 161 and 162 have slide guides 165 and 166 slidable along the slide rails 127 in the front-rear direction. Each slide base 106 constitutes a moving body moved by a force applied by a user for moving the screen unit 103 in the front-rear direction.

Figure 3:
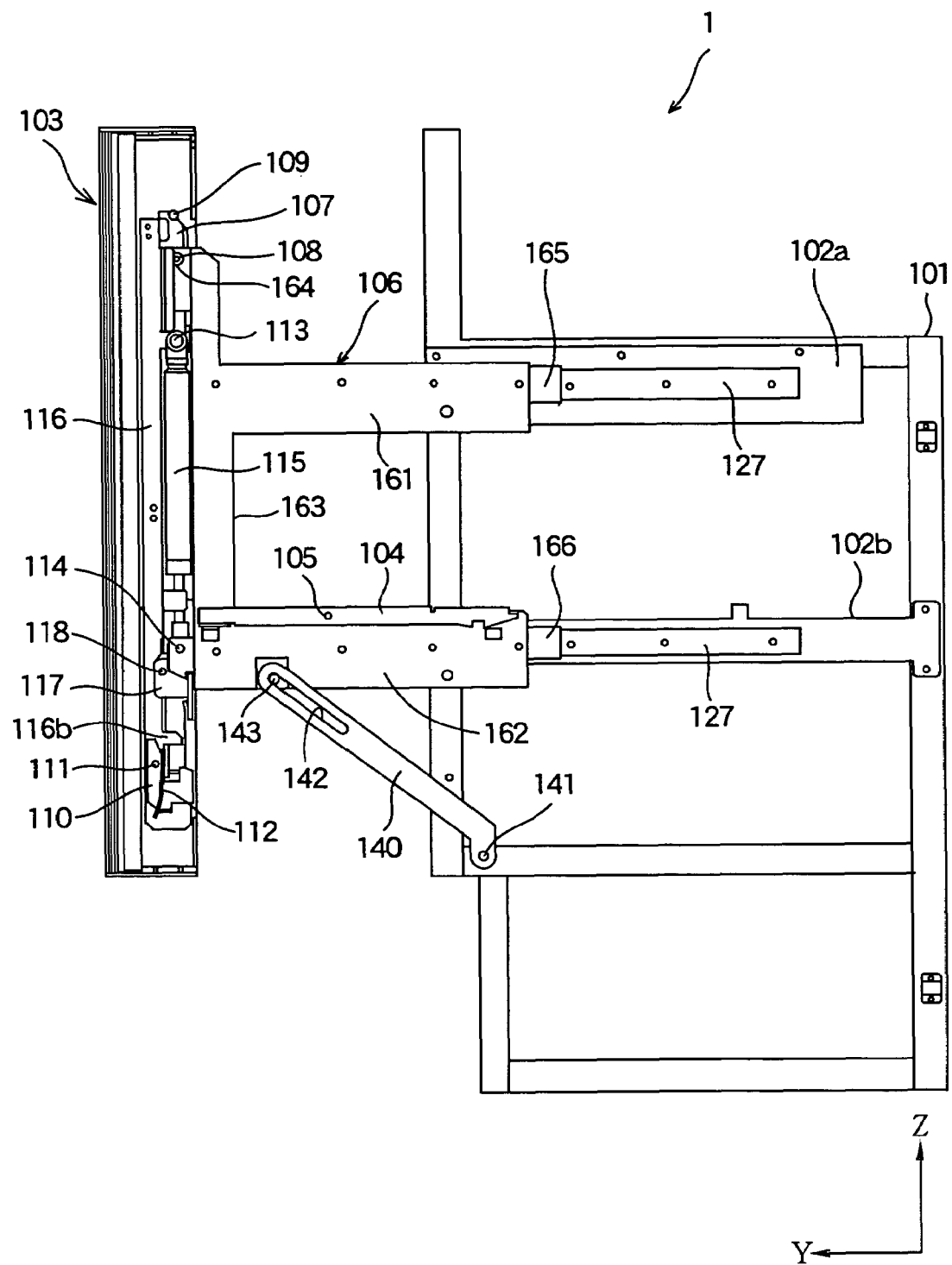
FIG. 3 is a sectional view of the projection display apparatus according to the embodiment of the present invention when a screen unit protrudes from a housing.

FIG. 3 is a sectional view of the projection display apparatus 1 illustrating the state where each slide base 106 protrudes from the housing 101 frontward (in the positive Y-direction) to an end of its movable range. The position of the slide base 106 shown in FIG. 3 is referred to as a protruding position. A lock mechanism shown in FIG. 4 is provided for locking the slide bases 106 at the protruding position.

Figure 4:
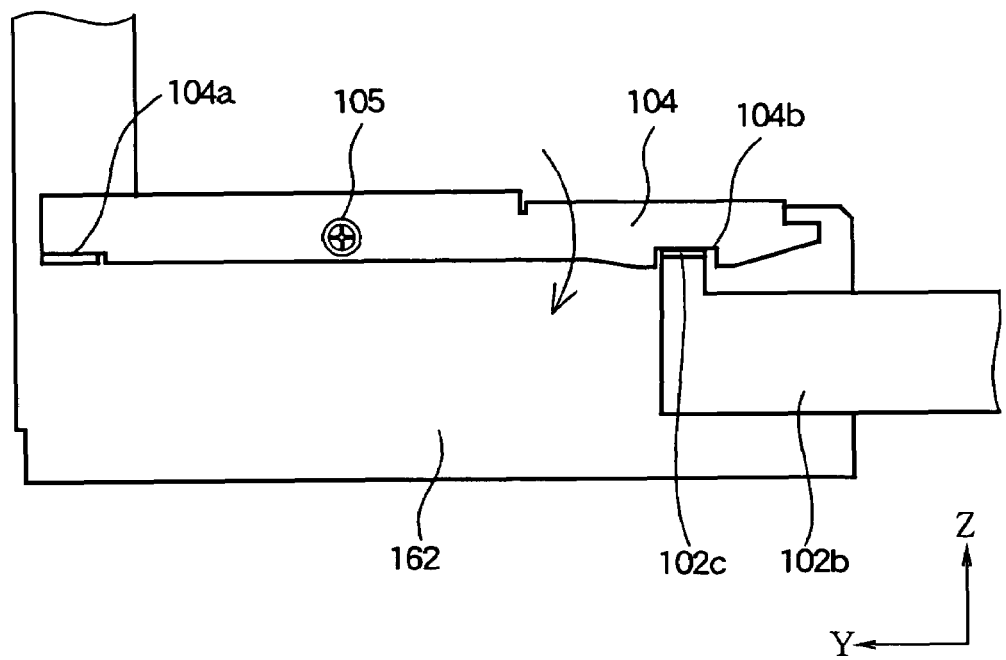
FIG. 4 is an enlarged view of a slide stopper of the projection display apparatus according to the embodiment of the present invention.

As shown in FIG. 4, slide stoppers 104 are provided on the lower horizontal portions 162 of the slide bases 106, and are elongated in the front-rear direction. The slide stoppers 104 are pivotally supported by pivot shafts 105 disposed substantially at the longitudinal centers of the slide stoppers 104. Each slide stopper 104 has a recess 104b formed on the bottom of the rear part of the slide stopper 104. Each slide stopper 104 is urged to rotate clockwise in FIG. 4 about the pivot shaft 105, because of the weight balance of the slide stopper 104. Each lower holder 102b has a convex portion 102c protruding upward and engagable with the recess 104b of the slide stopper 104. When the slide bases 106 reach the protruding position (FIG. 3), the convex portions 102c engage the recesses 104b of the slide stoppers 104, so that the slide bases 106 are locked at the protruding position. When the user pushes bent portions 104a formed on the front ends of the slide stoppers 104 downward, the recesses 104b disengage from the convex portions 102c, and therefore the locking of the slide bases 106 is released. The convex portions 102c are omitted in figures except FIG. 4.

Further, as shown in FIG. 3, pins 143 are formed on the lower horizontal portions 162 of the slide bases 106. The pins 143 fit in grooves 142 formed on swing levers 140 swingably provided on the housing 101 via support shafts 141. When the slide bases 106 reach the protruding position, the pins 143 abut against the ends of the grooves 142 so that the slide bases 106 do not protrude further.

Figure 5:
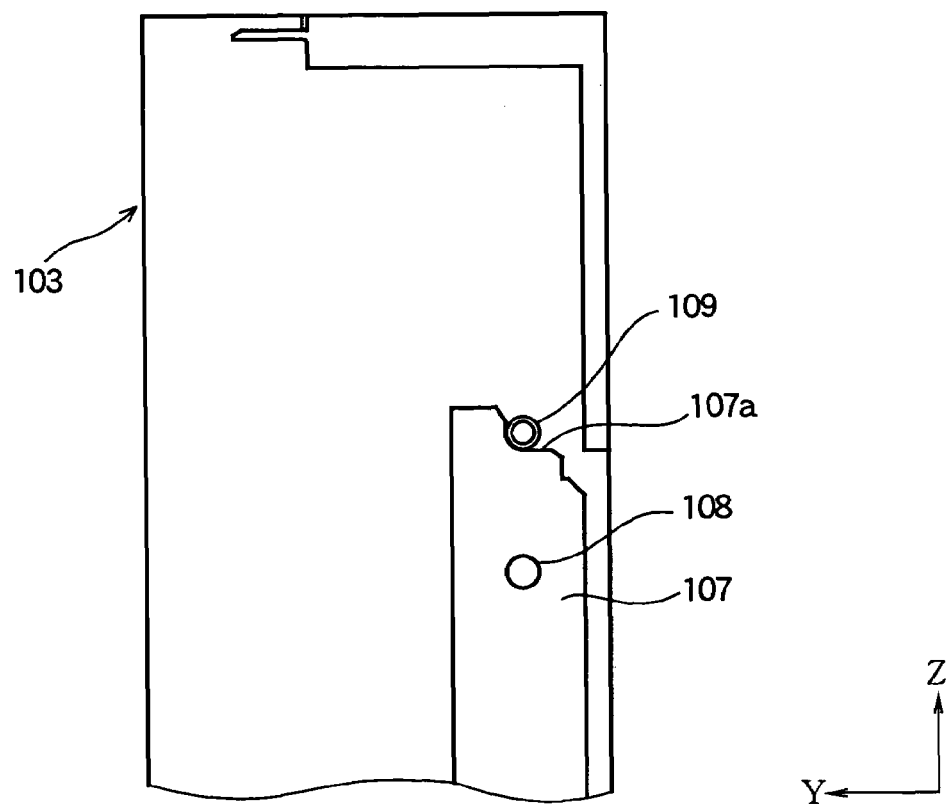
FIG. 5 is an enlarged view of a supporting structure of the screen unit of the projection display apparatus according to the embodiment of the present invention.
Figure 7A:
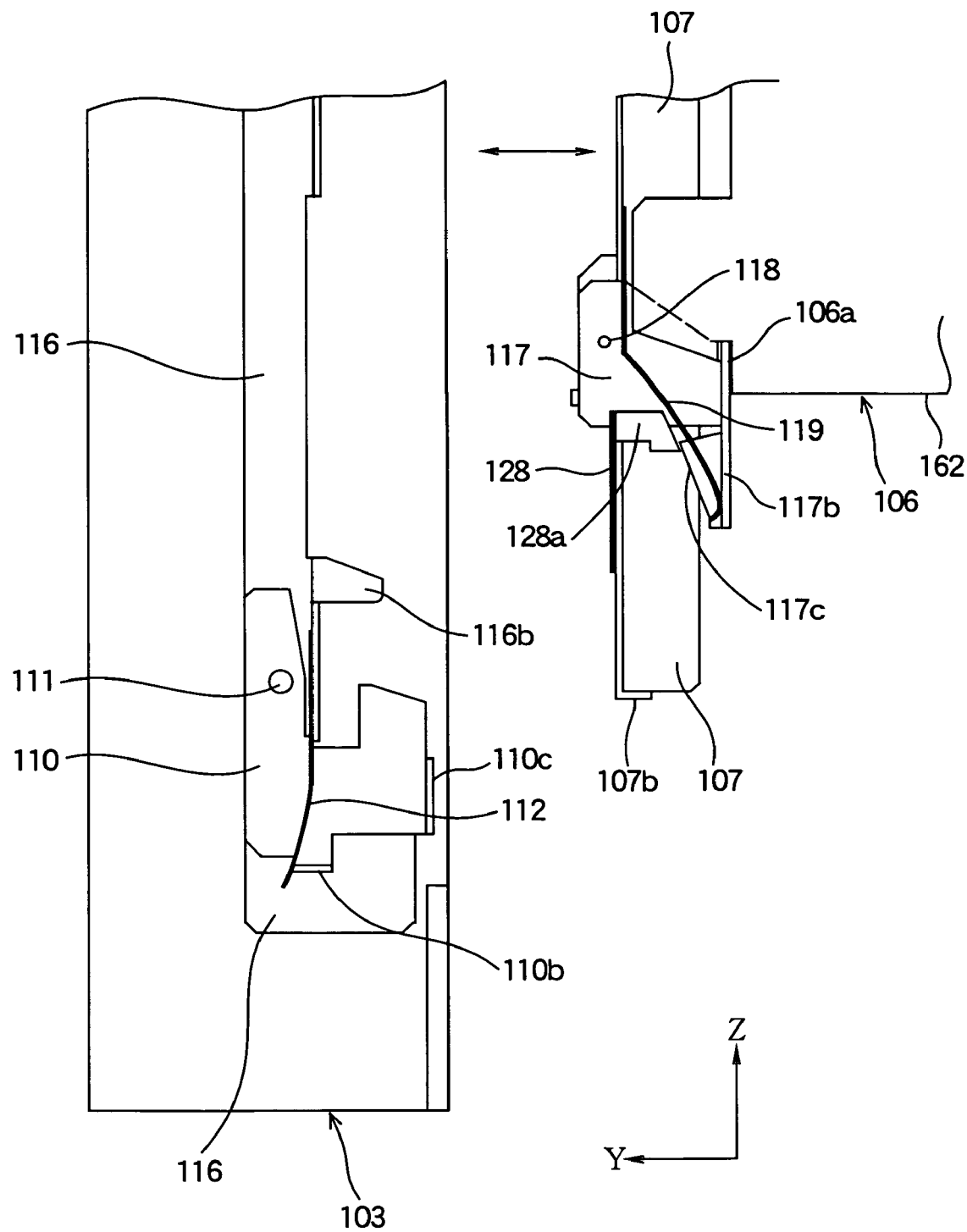
FIG. 7A is an enlarged view of the structure shown in FIG. 6 in a state where the screen unit separates from the rotation plates.
Figure 7B:
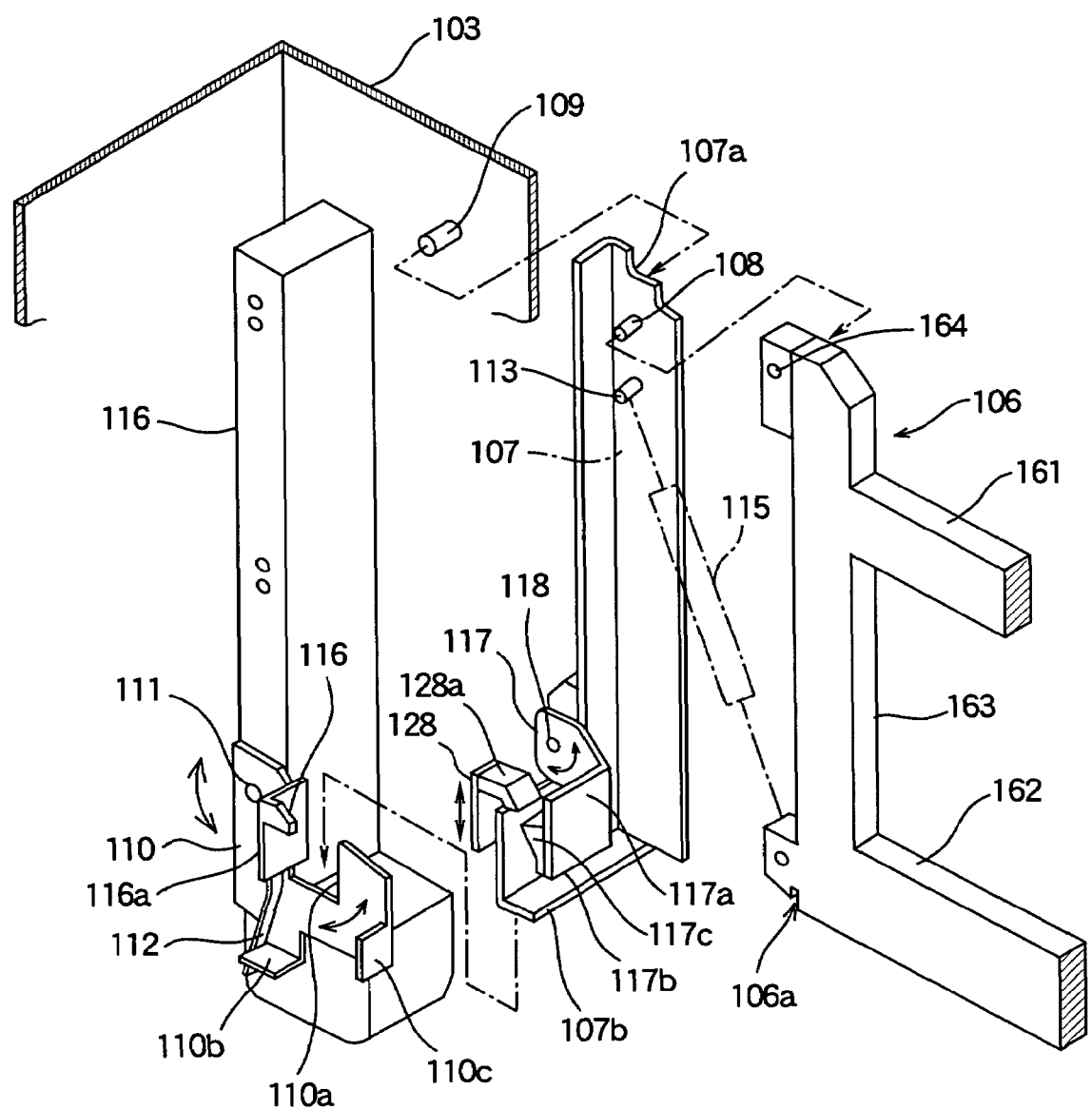
FIG. 7B is a schematic perspective view of the structure shown in FIG. 6.

The structure for rotatably supporting the screen unit 103 will be described. FIG. 5 is a schematic view of a structure for supporting the screen unit 103. The screen unit 103 has support pins 109 that protrude inwardly (in X-direction) from both sides of the screen unit 103. The support pins 109 are supported by cutout portions 107a formed at the top of rotation plates 107 rotatably supported by the slide bases 106 (FIG. 7B). The rear part of each cutout portion 107a is made flat so that the support pins 109 (and the screen unit 103) can be slid and detached from the rotation plates 107.

Each rotation plate 107 has a rotation shaft 108 parallel to X-direction. The rotation shafts 108 of the rotation plates 107 are supported by holding portions 164 (FIG. 7B) of the slide bases 106 so that the rotation plates 107 are rotatable about the rotation shafts 108.

As shown in FIG. 3, gas springs (i.e., a force generating mechanism) 115 are provided on the slide bases 106 for generating the force for rotating the screen unit 103 about the rotation shafts 108. The upper ends of the gas springs 115 are connected to support shafts 113 provided on the rotation plates 107. The lower ends of the gas springs 115 are connected to support shafts 114 provided on the slide bases 106. The gas springs 115 generate a force in the direction in which the gas springs 115 extend so that the rotation plates 107 rotate clockwise in FIG. 3. When the screen unit 103 is not locked as described later, the screen unit 103 rotates about the rotation shafts 108 clockwise in FIG. 3.

Figure 6:
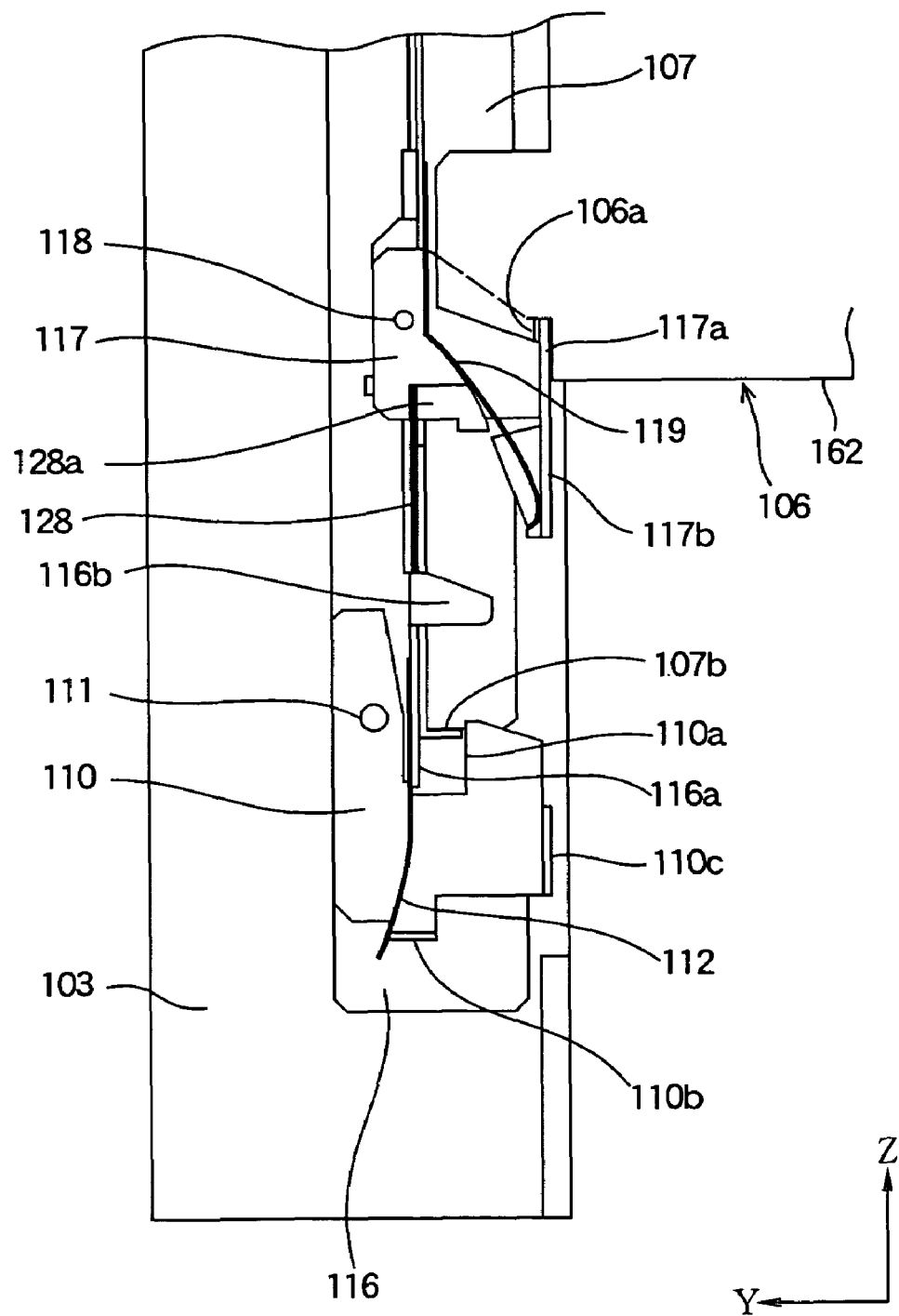
FIG. 6 is an enlarged view of a structure for integrally supporting the screen unit and rotation plates of the projection display apparatus according to the embodiment of the present invention.

FIG. 6 is an enlarged view of a structure for integrally supporting the screen unit 103 and the rotation plates 107. FIG. 7A is an enlarged view of the structure shown in FIG. 6 in a state where the screen unit 103 separates from the rotation plates 107. FIG. 7B is a schematic perspective view of the structure shown in FIG. 6. As shown in FIGS. 6 and 7B, the screen unit 103 has screen plates (i.e., supporting plates) 116 each of which has a plane surface parallel to the screen surface S. Separation stoppers 110 are rotatably supported by support shafts 111 provided on the screen plates 116.

The screen plates 116 have protruding pieces 116a in the vicinity of the support shafts 111. Plate springs 112 are fixed to the protruding pieces 116a for urging the separation stoppers 110. The plate springs 112 urge contact portions 110b formed at the separation stoppers 110 counterclockwise in FIG. 6. The separation stoppers 110 have holding portions 110a that substantially oppose the protruding pieces 116a of the screen plates 116. Fitting portions 107b are formed at the lower ends of the rotation plates 107 in such a manner that the fitting portions 107b are disposed between the protruding pieces 116a and the holding portions 110a of the separation stoppers 110. As the plate springs 112 urge the separation stoppers 110 counterclockwise in FIG. 6, the holding portions 110a of the separation stoppers 110 and the protruding pieces 116a of the screen plates 116 sandwich the fitting portions 107b therebetween. In this state, the screen plates 116 and the rotation plates 107 are integrally supported, and the rotation of the separation stoppers 110 are restricted by the plate springs 112. Accordingly, the screen unit 103 and the rotation plates 107 are integrally supported.

Operating portions 110c are formed at the rear ends (i.e., ends in the negative Y-direction) of the separation stoppers 110. By urging the operating portions 110c frontward (i.e., in the positive Y-direction), the holding portions 110a of the separation stoppers 110 move down and do not contact the fitting portions 107b of the rotation plates 107, and therefore the screen plates 116 can separate from the rotation plates 107. Thus, it becomes possible to detach the screen unit 103 from the rotation plates 107.

Next, the structure for locking the screen unit 103 for preventing the rotation thereof will be described. As shown in FIGS. 6, 7A and 7B, rotation stoppers 117 are supported by support shafts 118 provided on the rotation plates 107. The rotation stoppers 117 are plate-shaped, and have bent portions 117a at rear ends thereof. Plate springs 119 (omitted in FIG. 7B) are provided on the rotation plates 107 for urging the rotation stoppers 117 counterclockwise in FIGS. 6 and 7A. Because of the force of the plate springs 119, the upper ends of the bent portions 117a of the rotation stoppers 117 fit in recesses 106a formed on the slide bases 106, and therefore the rotation plates 107 are prevented from rotating.

By urging the lower portions (i.e., operating portions 117b) of the bent portions 117a of the rotation stoppers 117 downward, the upper portions of the bent portions 117a move out of the recesses 106a of the slide bases 106. Therefore, the locking of the rotation plates 107 is released, with the result that the screen unit 103 rotates clockwise in FIG. 6 because of the force of the gas springs 115.

The rotation plates 107 have regulating plates 128 for preventing the rotation stoppers 117 from rotating unintentionally. The regulating plates 128 are movable in the vertical direction. The regulating plates 128 have protrusions 128a at the upper ends thereof, and the protrusions 128a protrude rearward. The lower ends of the regulating plates 128 are urged upward by protrusions 116b of the screen plates 116, so that the protrusions 128a of the regulating plates 128 stay above contact portions 117c of the rotation stoppers 117. As shown in FIG. 7A, when the screen unit 103 is detached from the rotation plates 107, the protrusions 116b of the screen plates 116 do not urge the regulating plates 128, and therefore the regulating plates 128 move downward because of their own weight. Therefore, the protrusions 128a of the regulating plates 128 abut against the contact portions 117c of the rotation stoppers 117, with the result that the rotation stoppers 117 are prevented from rotating. Accordingly, even when the user mistakenly operates the operating portions 117b of the rotation stoppers 117 in a state where the screen unit 103 is detached from the rotation plates 107, the rotation stoppers 117 do not rotate, and therefore the rotation plates 107 do not rotate.

FIG. 8 is a sectional view of the projection display apparatus after the locking of the rotation plates 107 is released (i.e., after the rotation stoppers 117 rotate); When the above described locking of the rotation plates 107 is released, the gas springs 115 extend to reach their full strokes. As a result, the rotation plates 107 and the screen unit 103 integrally supported by the rotation plates 107 move to an opening position shown in FIG. 8. The screen unit 103 is kept at the opening position by the force of the gas springs 115. In other words, the gas springs 115 also have a function to lock the screen unit 103 at the opening position. The stroke of each gas spring 115 is determined so that the end of the screen unit 103 closer to the support pins 109 is lower than the opposite end of the screen unit 103. In this state shown in FIG. 8, the rotation plates 107 support the screen plates 116 of the screen unit 103 from below, and therefore the rotation plates 107 support the weight of the screen unit 103. In this state, the user is able to perform attaching and detaching operations of the screen unit 103 as described later.

Next, a lock mechanism that locks the screen unit 103 with respect to the housing 101 will be described. The lock mechanism is provided for preventing the screen unit 103 from protruding unintentionally, even when the housing 101 is placed on an inclined floor or even when the user mistakenly pulls the screen unit 103.

Figure 9:
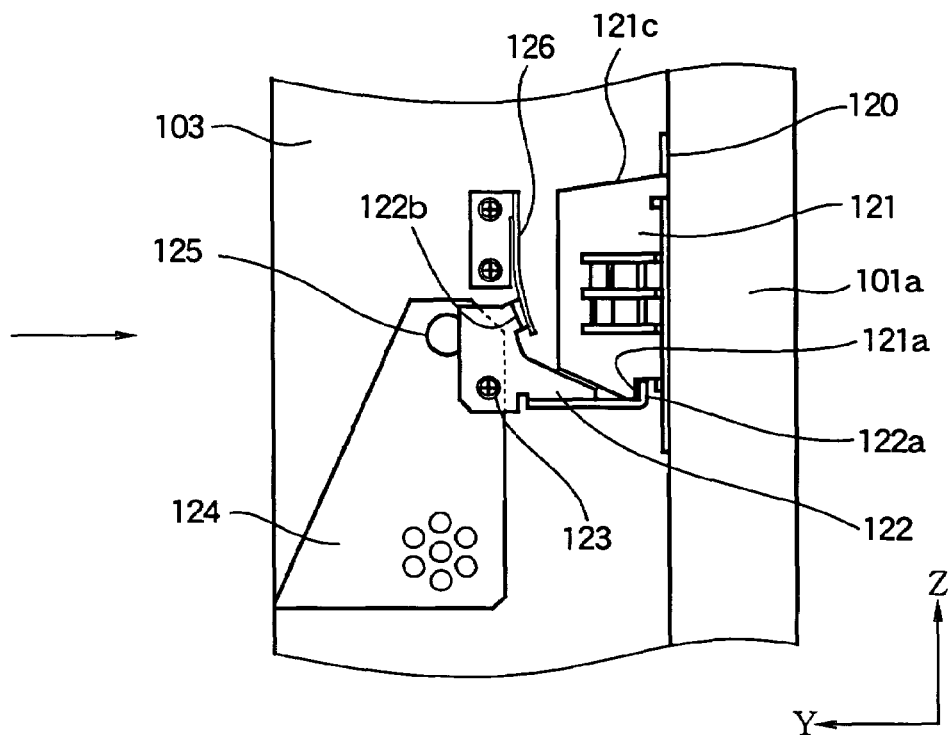
FIG. 9 is a sectional view of a lock mechanism of the projection display apparatus according to the embodiment of the present invention.
Figure 10:
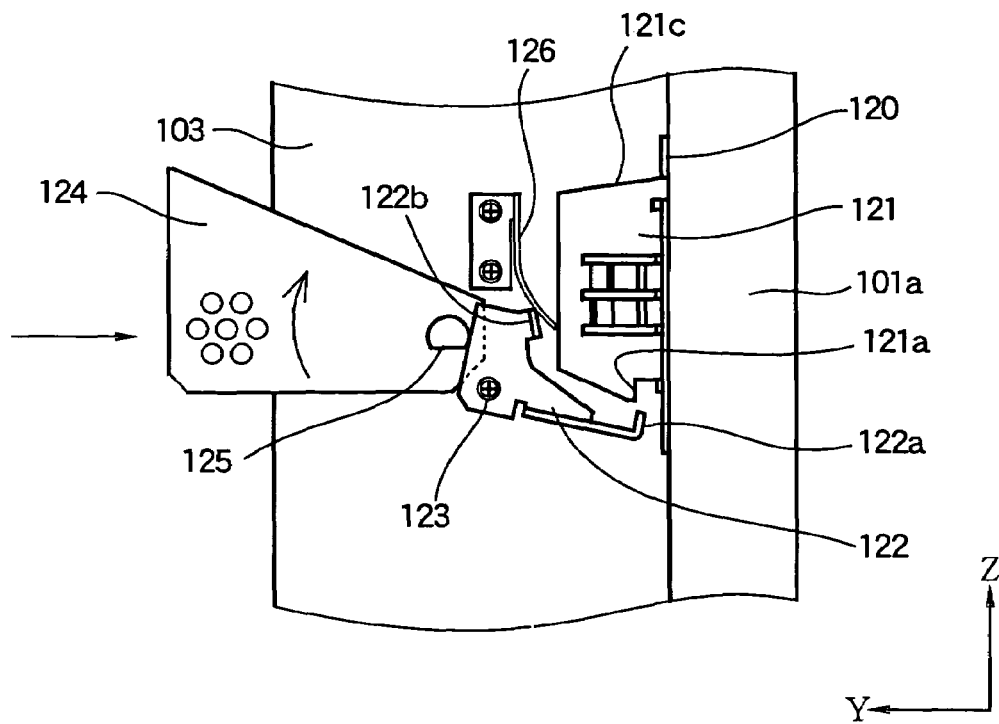
FIG. 10 is a sectional view illustrating the operation of the lock mechanism of the projection display apparatus according to the embodiment of the present invention.

FIGS. 9 and 10 are sectional views of the lock mechanism that locks the screen unit 103 with respect to the body 101. The lock mechanism includes handles 124 provided at both sides (FIG. 1) of the screen unit 103. The handles 124 are fixed to support pins 125 whose cross sections are substantially D-shaped. The support pins 125 are inserted into not-shown holes formed on both sides of the screen unit 103 so that the support pins 125 are rotatable. The screen unit 103 is provided with lock pieces 122 rotated by the handles 124. The lock pieces 122 are rotatably supported by support shafts 123 provided on both sides of the screen unit 103. The lock pieces 122 have hooks 122a at the lower ends thereof. The hooks 122a extend rearward, and the rearmost portions of the hooks 122a are bent upward. The lock pieces 122 have bent contact portions 122b that abut against plate springs 126 fixed to the screen unit 103. The lock pieces 122 are urged by the plate springs 126 to rotate counterclockwise in FIGS. 9 and 10.

Mounting plates 120 are fixed to both lateral ends of the front surface of a front frame 101a of the housing 101. Lock plates 121 are fixed to the mounting plates 120. The lock plates 121 have surfaces substantially perpendicular to X-direction. Upper end surfaces 121c of the lock plates 121 are inclined, and the rear ends (i.e., the ends in the negative Y-direction) of the upper end surfaces 121c are higher than the front ends thereof. The hooks 122a of the lock pieces 122 engage the cutout portions 121a formed on the bottom of the lock plates 121, so that the screen unit 103 is prevented from protruding.

As shown in FIG. 10, when the handles 124 are rotated clockwise in FIG. 10, the support pins 125 rotate with the handles 124, and the support pins 125 urge the lock pieces 122 so that the lock pieces 122 rotate clockwise in FIG. 10. By the rotation of the lock pieces 122, the hooks 122a of the lock pieces 122 move out of the cutout portions 121a of the lock plates 121, and therefore the screen unit 103 can protrude frontward.

Figure 11:
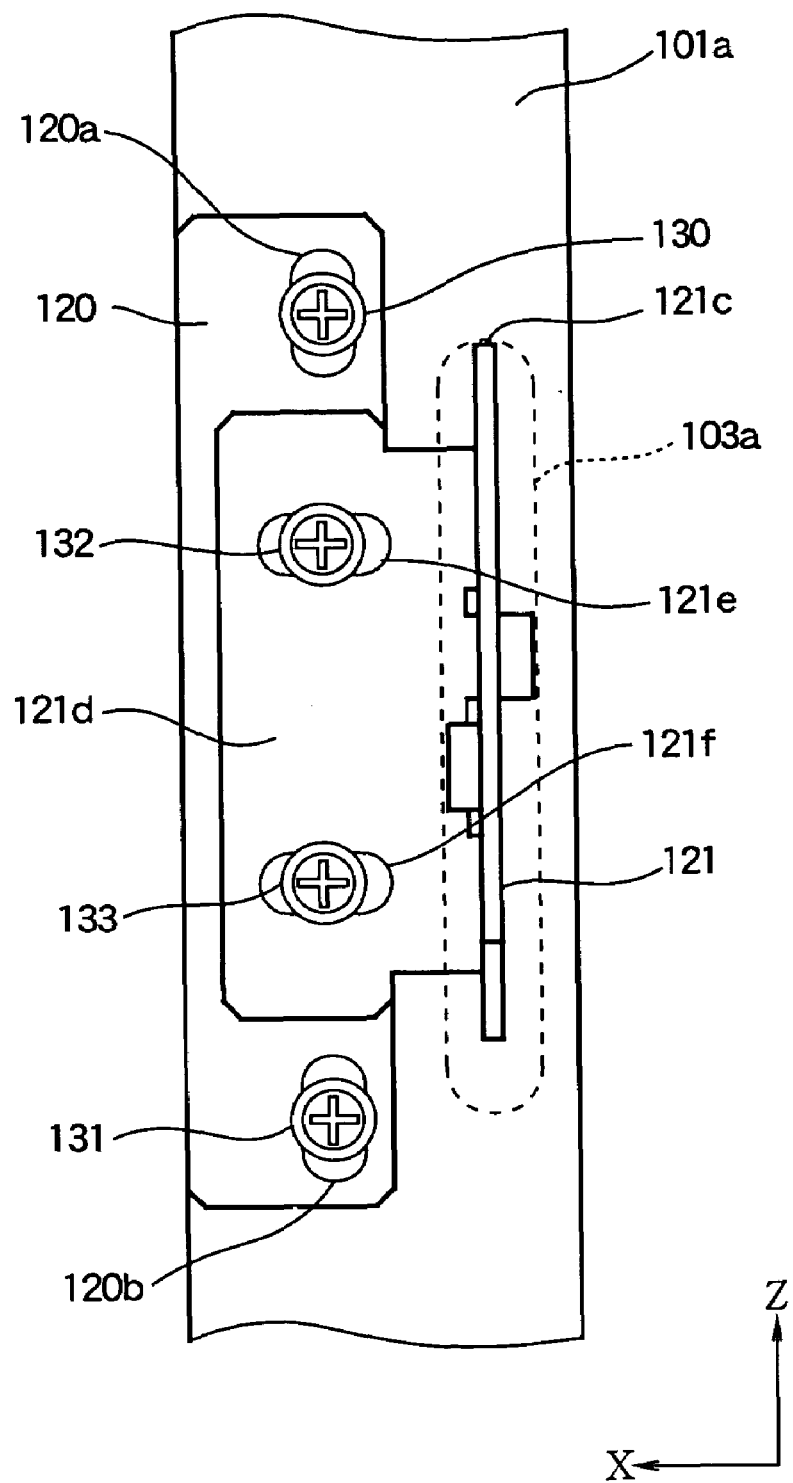
FIG. 11 is a front view illustrating a position adjusting function of the lock mechanism of the projection display apparatus according to the embodiment of the present invention.
Figure 12:
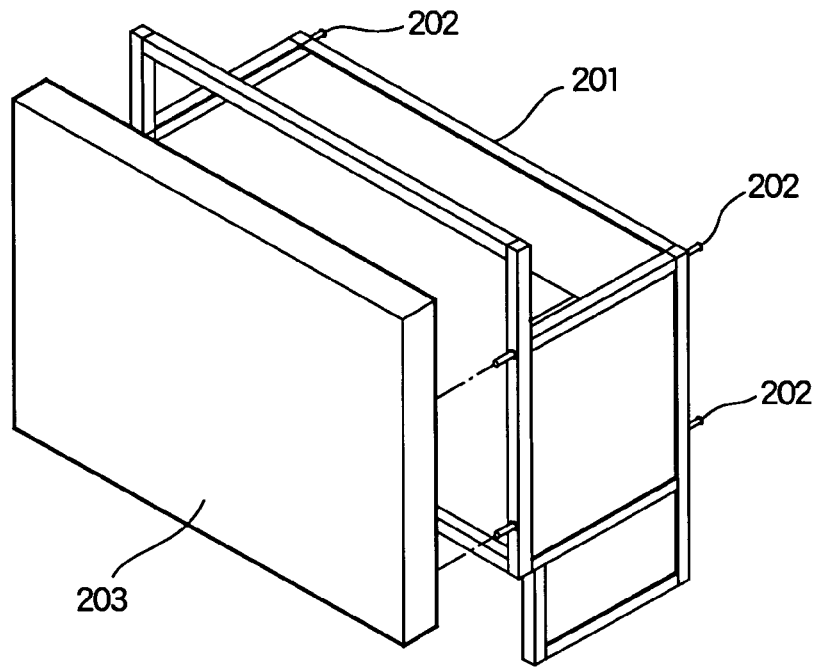
FIG. 12 is a perspective view of an example of a conventional projection display apparatus.
Figure 13:
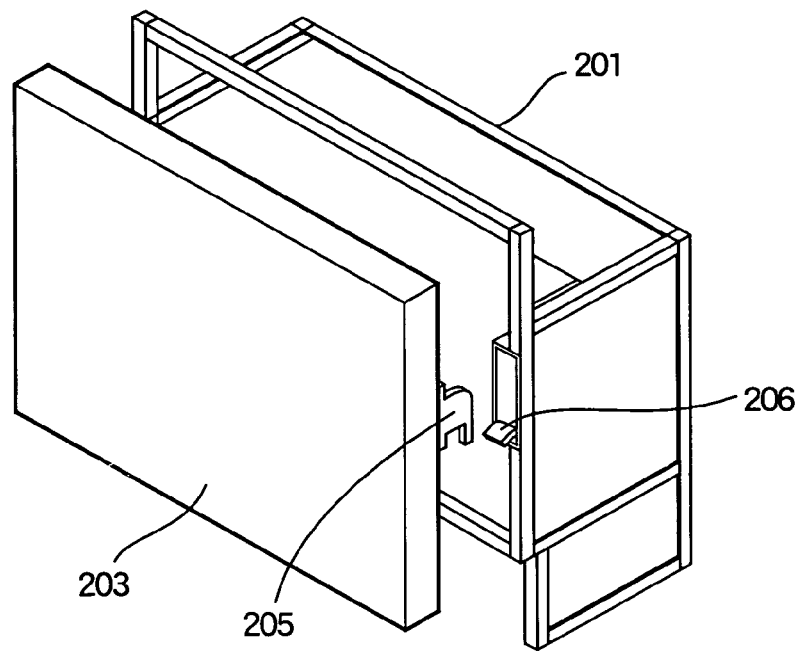
FIG. 13 is a perspective view of another example of a conventional projection display apparatus.

The lock mechanism of the screen unit 103 is further arranged to enable the adjustment of the relative position of the screen unit 103 with respect to the housing 101 in the horizontal direction (i.e., X-direction) and in the vertical direction (i.e., Z-direction). FIG. 11 is a front view of the lock mechanism, with the handles 124 and the lock pieces 122 being omitted. As shown in FIG. 11, engaging holes 103a (shown by a dashed line in FIG. 11) are formed on a rear surface of the screen unit 103. When the screen unit 103 moves from the protruding position (FIG. 3) to the non-protruding position (FIG. 2), the engaging holes 103a of the screen unit 103 engage the lock plates 121 of the housing 101, and the screen unit 103 is slightly lifted upward because of the above described inclination of the upper end surfaces 121c of the lock plates 121. In this state, the support pins 109 (FIGS. 5 and 7B) of the screen unit 103 move slightly upward from the cutout portions 107a of the rotation plates 107. The plates 120 and 121 and the engaging holes 103a are respectively disposed at both sides of the screen unit 103, and therefore the vertical position of the screen unit 103 is determined by the position of the lock plates 121.

As shown in FIG. 11, each mounting plate 120 has elongated holes 120a and 120b elongated in Z-direction. Each mounting plate 120 is fixed to the front frame 101a of the housing 101 by means of screws 130 and 131 inserted through the elongated holes 120a and 120b. Further, each lock plate 121 has a mounting portion 121d with elongated holes 121e and 121f elongated in X-direction, and is fixed to the mounting plate 120 by means of screws 132 and 133 inserted through the elongated holes 121e and 121f. By loosening the screws 130 and 131, the position of each mounting plate 120 can be adjusted in Z-direction, and therefore the position of the screen unit 103 can be adjusted in Z-direction. By loosening the screws 132 and 133, the position of each lock plate 120 can be adjusted in X-direction, and therefore the position of the screen unit 103 can be adjusted in X-direction. The adjustment of the screen unit 103 in X-direction is performed within the range (for example, ±1.0 mm) in which the resilient deformation of the slide bases 106 and the slide rails 127 are permitted.

Next, the operation of the projection display apparatus 1 according to the embodiment will be described. In order to detach the screen unit 103 from the housing 101, the user operates the handles 124 so that the hooks 122a of the lock pieces 122 move out of the cutout portions 121a of the lock plates 121, so that the locking of the screen unit 103 is released. Then, the user pulls the screen unit 103 (as well as the slide bases 106) frontward until the slide bases 106 reach the protruding position as shown in FIG. 3. In this state, as shown in FIG. 4, the convex portions 102c of the lower holders 102b fit in the recesses 104b of the slide stoppers 104, so that the slide bases 106 are locked at the protruding position.

Further, as shown in FIG. 6, the user rotates the rotation stoppers 117, so that the bent portion 117a of the rotation stoppers 117 move out of the recesses 106a of the slide bases 106. As a result, the locking of the rotation of the screen unit 103 is released, and therefore the screen unit 103 rotates to the above described opening position (i.e., the operating position) by the force of the gas springs 115 as shown in FIG. 8.

In the opening position shown in FIG. 8, the screen plates 116 (and the screen unit 103) are supported by the rotations plates 107 from below in such a manner that the screen plates 116 are substantially horizontally oriented. When the user rotates the separation stoppers 110 shown in FIGS. 6 and 7B, the fitting portions 107b of the rotation plates 107 are released from between the screen plates 116 and the holding portions 110a of the separation stoppers 110, so that it becomes possible to detach the screen unit 103 from the rotation plates 107. The user moves the screen unit 103 rearward (i.e., in the negative Y-direction) by a small amount, and then moves the screen unit 103 upward, with the result that the supporting pins 109 separate from the cutout portions 107a (FIG. 5) of the rotation plates 107. Thus, it is possible to prevent the screen unit 103 from dropping on the floor, and therefore the reliability of the detaching operation is enhanced. In a state where the screen unit 103 is in the opening position, the screen unit 103 is slightly inclined in such a manner that the front end (i.e., the end in the positive Y-direction) is higher than the rear end (i.e., the end in the negative Y-direction), and therefore the operation becomes easy.

In order to attach the screen unit 103 to the housing 101, the user places the screen unit 103 on the rotation plates 107 in such a manner that the fitting portions 107a of the rotation plates 107 are sandwiched between the separation stoppers 110a and the screen plates 106 as shown in FIG. 6, with the result that the screen unit 103 and the rotation plates 107 are integrally supported. Then, the user rotates the screen unit 103 from the opening position (FIG. 8) to the closing position (FIG. 3) resisting the force of the gas springs 115. In this state, because of the force of the plate springs 119, the bent portions 117a of the rotation stoppers 117 engage the recesses 106a of the slide bases 106, with the result that the rotation of the screen unit 103 is locked. Then, the user presses the bent portions 104a of the slide stoppers 104 shown in FIG. 4 downward. Therefore, the convex portions 102c of the lower holders 102b move out of the recesses 104b of the slide stoppers 104, and the slide bases 106 becomes movable. Then, the user pushes the screen unit 103 rearward (in the negative Y-direction) to the position shown in FIG. 2 where the projection unit 2 is able to project the image on the screen S of the screen unit 103.

As described above, according to the projection display apparatus 1 of the embodiment, the screen unit 103 moves and rotates to the operating position (the opening position) shown in FIG. 8 in which the attaching and detaching operations of the screen unit 103 can be performed. Thus, it is possible to prevent the screen unit 103 from being dropped on the floor, and therefore the reliability of the operations can be enhanced. Further, by moving the screen unit 103 frontward, it becomes possible to perform the maintenance of the internal components (for example, the projection unit 2) in the housing 101. Thus, it is not necessary to provide a working space for maintenance at the rear of the housing 101, and therefore the maintenance becomes easy.

Moreover, the position of the screen unit 103 can be adjusted in the left-right direction and in the vertical direction by adjusting the positions of the plates 120 and 121.

Thus, even when a plurality of projection display apparatuses 1 constitute a multi-projector, it becomes easy to adjust the position of one screen S to the other screens S.

Further, during the attaching and detaching operations of the screen unit 103, the screen unit 103 is supported on the rotation plates 107, the slide bases 106 is locked at the protruded position, and the rotation plates 107 is locked at the opening position. Thus, the reliability of the operation is further enhanced.

Additionally, the slide bases 106 support the rotation plates 107 via the rotation shafts 108, and the rotation plates 107 supports the screen unit 103 via the support pins 109, and therefore it is possible to move and rotate the detachable screen unit 103 with a simple structure.

In addition, the screen unit 103 rotates from the closing position to the opening position by the force of the gas springs 115, and therefore the load of the user can be minimized and the operation becomes easy.

While the preferred embodiment of the present invention has been illustrated in detail, it should be apparent that modifications and improvements may be made to the invention without departing from the spirit and scope of the invention as described in the following claims.

What is claimed is:

1. A projection display apparatus comprising:
    a screen unit having a screen on which an image can be projected;
    a projection unit that projects said image on said screen from the rear of said screen;
    a slide mechanism that supports said screen unit so that said screen unit is movable in a first direction, said first direction being perpendicular to said screen in a state where said image can be projected on said screen; and
    wherein the slide mechanism further includes,
    two laterally symmetrical slide bases, each slide base having an upper and a lower extensions extending in a front to rear direction, wherein,
    the upper and lower extensions each have a slide guide in the front to rear direction; and
    a rotation mechanism that supports said screen unit so that said screen unit is rotatable about a rotation axis parallel to a second direction, said second direction being parallel to said screen in a state where said image can be projected on said screen.

2. The projection display apparatus of claim 1, further comprising:
    a housing in which at least said projection unit is accommodated; and
    a lock mechanism which locks said screen unit to said housing.

3. The projection display apparatus of claim 2, wherein said lock mechanism includes an adjustment mechanism for adjusting the position of said screen unit with respect to said housing.

4. The projection display apparatus of claim 1, further comprising a mechanism which locks said slide mechanism and said rotation mechanism when said screen unit is in an operating position in which attaching and detaching operations of said screen unit can be performed.

5. The projection display apparatus of claim 4, wherein said rotation mechanism supports said screen unit so that said screen unit is not dropped therefrom when said screen unit is in said operating position.

6. The projection display apparatus of claim 5, wherein said slide mechanism includes a linearly movable body, said rotation mechanism includes a rotation plate supported by said linearly movable body so that said rotation plate is rotatable about said rotation axis, and said rotation plate supports said screen unit in said operating position.

7. The projection display apparatus of claim 6, wherein said rotation plate supports said screen unit from below in such a manner that said screen unit is substantially horizontally oriented.

8. The projection display apparatus of claim 1, wherein said rotation mechanism includes a mechanism that generates a force for rotating said screen unit.

* * * * *